UNITED STATES PATENT OFFICE.

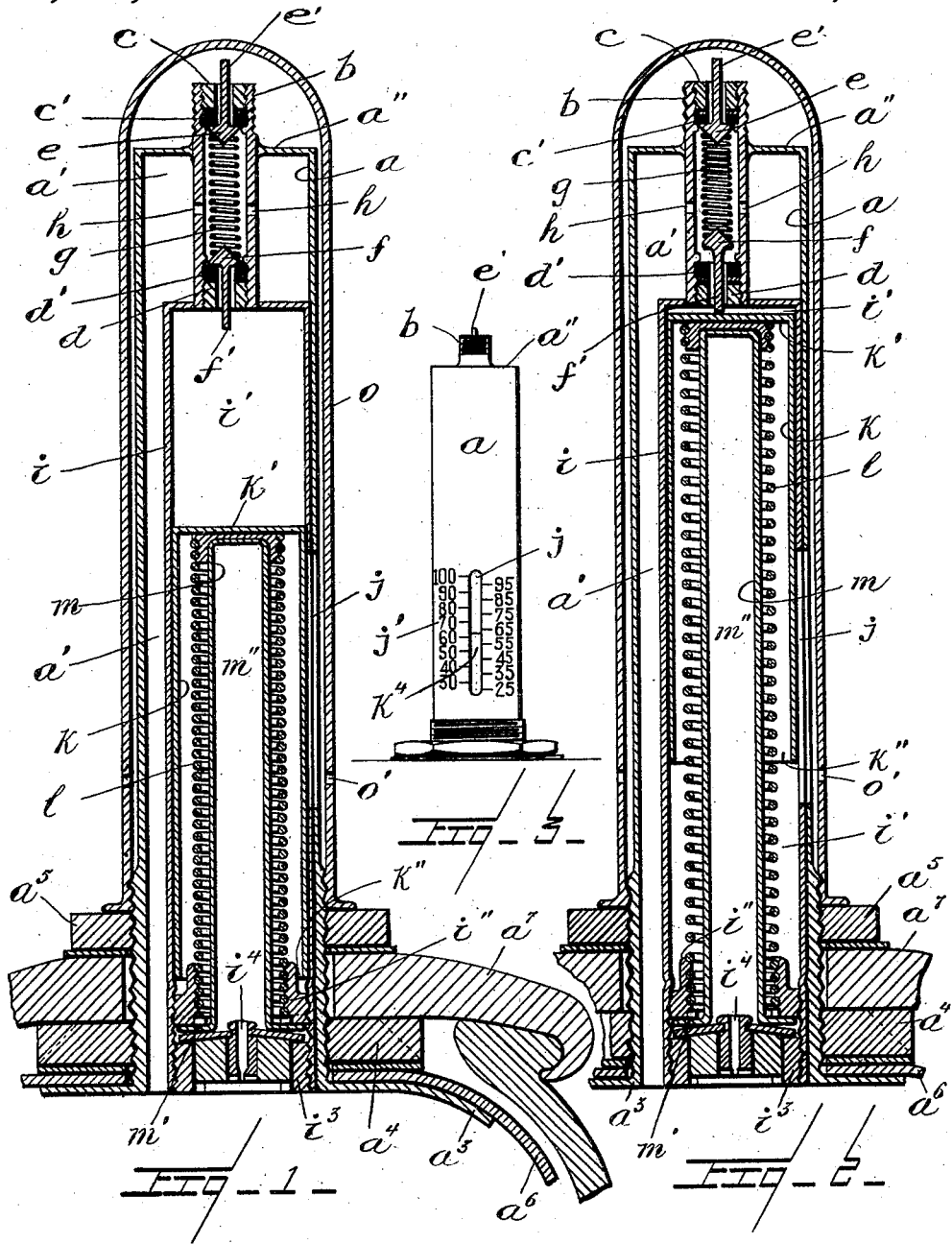

JESSE CLAIR BRAKEMAN, OF TORONTO, ONTARIO, CANADA.

PRESSURE-CONTROLLING DEVICE FOR PNEUMATIC TIRES.

1,403,006.  Specification of Letters Patent.  Patented Jan. 10, 1922.

Application filed August 14, 1920. Serial No. 403,550.

*To all whom it may concern:*

Be it known that I, JESSE CLAIR BRAKEMAN, a citizen of the United States, and resident of the city of Toronto, in the county of York and Province of Ontario, Dominion of Canada, have invented certain new and useful Improvements in Pressure-Controlling Devices for Pneumatic Tires; and I hereby declare the following to be a full, clear, and exact description of the same.

The object of my invention is to construct a device which will automatically indicate and relieve the pressure of the fluid in the air tube of a pneumatic tire when it exceeds that for which the device is set.

With this object in view the invention consists essentially of an inflating stem preferably taking the form of a tubular casing of any usual or approved construction, adapted for attachment to the air tube of the tire, and having therein a chamber provided with a valve closed relief port, and a movable member actuated by the pressure of the fluid within the air tube to automatically open the valve closed relief port and relieve the excess pressure.

For an understanding of one means by which this object may be attained reference is to be had to the following description and to the accompanying drawings in which—

Fig. 1 is a vertical section of the pressure controlling device showing the parts in their normal position, Fig. 2 is a similar view to Fig. 1, showing the parts actuated to relieve the excess pressure, and Fig. 3 is an external view of the device.

Like characters of reference refer to like parts throughout the specification and drawings.

$a$ represents a tubular casing, preferably corresponding in structural details with the usual type of inflating stem with which air tubes of pneumatic tires are now equipped, in the interior of which is a chamber, $a'$, for the fluid. Fitted into, or forming part of the head, $a''$, of the casing is a tubular way, $b$, for the fluid. At or near the outer end of the tubular way is a hollow nipple, $c$, and at or near its inner end is a hollow nipple, $d$, these being respectively the inlet and relief ports for the chamber, $a'$, and in the opposed faces of the nipples $c$ and $d$ are valve seats, $c'$, $d'$, respectively.

Engaging the valve seat $c'$, is a valve $e$, provided with a valve pin $e'$, extending through the nipple $c$, and slightly beyond the outer end of the tubular way $b$.

Engaging the valve seat, $d'$, is a valve, $f$, provided with a valve pin, $f'$, extending through the nipple, $d$, and beyond the inner end of the tubular way, $b$.

The length of the valve pin, $f'$, is regulated to the predetermined pressure at which the valve $f$, will be moved from its seat. For example, if the valve is to open at a pressure of one hundred pounds per square inch, the valve pin may be of a length to extend one sixteenth of an inch beyond the inner end of the tubular way, $b$. If it is to open at a pressure of ninety-five pounds per square inch the valve pin will be of a length to extend two sixteenths of an inch beyond the inner end of the tubular way, and so on, the length of the valve pin increasing one sixteenth of an inch for each five pounds of decrease of pressure. These measurements are given only as an example of the construction and operation of the device and it is to be understood that they may be varied within a wide range.

Within the tubular way, $b$, is a coiled spring, $g$, bearing against the valves $e$ and $f$, and normally holding them on the valve seats, $c'$, $d'$, respectively.

Formed through the wall of the tubular way, $b$, are orifices, $h$, establishing a passage for the fluid from the inlet port through the tubular way to the chamber, $a'$, of the casing $a$, when the fluid is being forced into the tire, and from the chamber $a'$, through the tubular way to the relief port when the valve $f$ is lifted from its seat to relieve the pressure within the tire.

Within the casing $a$, is a cylindrical wall, $i$, extending from the base of the casing to the inner end of the tubular way $b$, and of less diameter than and suitably separated from the inner surface of the casing to form the chamber $a'$, through which the fluid passes to and from the tubular way, the cylindrical wall, $i$, being preferably arranged eccentrically to the inner circumference of the casing, and in airtight contact with it where their surfaces meet.

Formed through the contacting part of the surfaces of the casing and cylindrical wall is a slot, $j$, and on the outer surface of the casing along the sides of the slot are graduations, $j'$, for indicating the pressure of the fluid.

Within the cylindrical wall, $i$, is a chamber, $i'$, in which is a pressure actuated member $k$, taking the form of a hollow piston or plunger, having a closed head, $k'$, and an open base, $k''$, and on the peripheral surface of this piston or plunger is an indicator $k^4$, operating in conjunction with the graduations, $j'$.

The length of this piston or plunger is considerably less than that of the chamber $i'$ for its lengthwise movement therein, and within the chamber $i'$ near its base is a stationary plug $i''$, having a central bore.

Secured to the inner surface of the head, $k'$, of the piston or plunger and to the inner surface of the plug $i''$ is a coiled retracting spring, $l$.

Extending through the bore of the plug $i''$, and through the coiled spring $l$, to the head $k'$, is an elastic tube, $m$, having a closed top and an open base with a surrounding flange, $m'$, clamped between the stationary plug $i''$, and a removable plug, $i^3$, inserted in the base of the cylindrical wall. The bore of this elastic tube forms a pressure chamber, $m''$, into which the fluid is admitted through a restricted orifice, $i^4$, in the plug $i^3$.

At the base of the casing $a$, is a plate $a^3$, to engage the inner surface of the air tube, the outer surface of the casing adjacent to the plate being threaded to receive the clamping nuts $a^4$, $a^5$, by which the casing is secured to the air tube, $a^6$, and wheel rim, $a^7$, respectively.

In the use of the device, compressed air, forced through the inlet port $c$, displaces the valve $e$, and enters the tubular way $b$, from which it egresses through the orifices $h$, to the chamber $a'$, and air tube $a^6$, until the pressure in the air tube and chamber exceeds that at which the device is set.

The fluid in the air tube, entering the pressure chamber $m''$, distends the elastic tube $m$ and gradually forces the piston head $k'$, towards the valve pin $f'$ against the retraction of the spring $l$, the indicator of the pressure actuated member $k$, and the graduations $j'$ along the sides of the slot $j$, then showing the gradual increase of pressure within the tire so that the filling of the tire may be discontinued when the fluid attains the pressure at which the device is set.

If this is not done, the fluid in the chamber $m''$ when the pressure exceeds that at which the device is set, will force the piston head into engagement with the pin $f'$, and automatically displace the valve $f$ from its seat.

The fluid will then flow through the relief port $d$, into the top of the chamber $i'$, and pass between the wall of the piston $k$ and the cylindrical wall $i$, to the slot $j$, through which it egresses.

When the pressure in the tire falls to or below that at which the device is set the spring $l$ immediately retracts the piston $k$ and the spring $g$ restores the valve $f$ to the valve seat $d'$, and closes the relief port $d$.

The same action of the valve $f$ will occur when the pressure in the air tube is increased, by expansion due to friction or heat, beyond the pressure at which the device is set.

To protect the device from dust, etc., the valve casing is provided with a cover $o$, having perforations $o'$, through which the fluid can egress from the slot $j$.

What I claim is—

1. In a pressure controlling device for pneumatic tires the combination of an inflating stem having valve controlled inlet and relief ports, and relief means therein comprising a tubular housing connected at one end with the relief port, and having a restricted opening at its opposite end, a sliding member within the housing to automatically open the relief port when actuated by the pressure admitted through the restricted opening, and a spring to retract said member.

2. In a pressure controlling device for pneumatic tires the combination of an inflating stem having valve controlled inlet and relief ports, and relief means therein comprising a tubular housing connected at one end with the relief port and having a restricted opening at its opposite ends, a sliding member within the housing, and an elastic pressure chamber within said member in communication with the restricted opening.

Toronto, Canada, August 9th, 1920.

JESSE CLAIR BRAKEMAN.

Signed in the presence of—
C. E. SHERRIFF,
C. H. RICHES.